(12) United States Patent
Wu et al.

(10) Patent No.: US 10,782,882 B1
(45) Date of Patent: Sep. 22, 2020

(54) DATA FINGERPRINT DISTRIBUTION ON A DATA STORAGE SYSTEM

(71) Applicant: EMC IP Holding Company LLC, Hopkinton, MA (US)

(72) Inventors: Peng Wu, Westborough, MA (US); Bin Dai, Marlborough, MA (US); Rong Yu, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/387,997

(22) Filed: Apr. 18, 2019

Related U.S. Application Data

(63) Continuation of application No. 15/884,519, filed on Jan. 31, 2018, now Pat. No. 10,303,365.

(51) Int. Cl.
*G06F 3/06* (2006.01)
*H04L 9/06* (2006.01)

(52) U.S. Cl.
CPC .......... *G06F 3/0608* (2013.01); *G06F 3/0659* (2013.01); *G06F 3/0683* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 8,306,948 B2 * | 11/2012 | Chou | G06F 16/1748 707/610 |
| 8,402,250 B1 * | 3/2013 | Juillard | G06F 16/137 711/216 |
| 2012/0166401 A1 * | 6/2012 | Li | G06F 16/2246 707/692 |

* cited by examiner

*Primary Examiner* — Kevin Verbrugge
(74) *Attorney, Agent, or Firm* — Muirhead and Saturnelli, LLC

(57) ABSTRACT

Fingerprints of data portions are distributed in a balanced manner across active controllers of a data storage system, and may be done so in such a manner that, when a new active controller is added to the system, fingerprint ownership and movement between pre-existing active controllers, and active controllers overall, is minimized When a new active controller is added to the system and fingerprints are redistributed, no fingerprint ownership may be re-assigned between pre-existing active controllers and no fingerprints may be moved between pre-existing active controllers, for example, between local memories of the active controller.

20 Claims, 22 Drawing Sheets

|  | Engine 1 | Engine 2 | Engine 3 | Engine 4 | Engine 5 | Engine 6 | Engine 7 | Total |
|---|---|---|---|---|---|---|---|---|
| The 8th engine sub-chunks | C8_1 (30) | C8_2 (30) | C8_3 (30) | C8_4 (30) | C8_5 (30) | C8_6 C8_7 (60) | X | 210 |
| The 7th engine sub-chunks | C7_1 (40) | C7_2 (40) | C7_3 (40) | C7_4 (40) | C7_5 (40) | C7_6 (10) | X | 210 |
| Total | 70 | 70 | 70 | 70 | 70 | 70 |  | 420 |

FIG. 11

| Fingerprint Group Value Range | Number of active storage controllers | | | | | | | |
|---|---|---|---|---|---|---|---|---|
| | 1 | 2 | 3 | 4 | 5 | 6 | 7 | 8 |
| 0 - 209 | 1 | 1 | 1 | 1 | 1 | 1 | 1 | 1 |
| 210 - 419 | 1 | 2 | 2 | 2 | 2 | 2 | 2 | 2 |
| 420-573 | 1 | 1 | 3 | 3 | 3 | 3 | 3 | 3 |
| 574-629 | 1 | 2 | 3 | 3 | 3 | 3 | 3 | 3 |
| . . . | | | | | | | | |
| 1420-1444 | 1 | 2 | 3 | 3 | 5 | 5 | 7 | 7 |
| . . . | | | | | | | | |
| 1650-1679 | 1 | 2 | 3 | 4 | 5 | 6 | 7 | 8 |

FIG. 16

| Controller | Chunk or sub-chunk | Fingerprint group range | Number of active controllers and fingerprint owning controller | | | | | | | |
|---|---|---|---|---|---|---|---|---|---|---|
| | | | 1 | 2 | 3 | 4 | 5 | 6 | 7 | 8 |
| 1 | C1 | 0-209 | 1 | 1 | 1 | 1 | 1 | 1 | 1 | 1 |
| 2 | C2 | 210-419 | 1 | 2 | 2 | 2 | 2 | 2 | 2 | 2 |
| 3 | C3_1 | 420-573 | 1 | 1 | 3 | 3 | 3 | 3 | 3 | 3 |
| | C3_2 | 574-629 | 1 | 2 | 3 | 3 | 3 | 3 | 3 | 3 |
| 4 | C4_1 | 630-769 | 1 | 1 | 1 | 4 | 4 | 4 | 4 | 4 |
| | C4_2 | 770-813 | 1 | 2 | 2 | 4 | 4 | 4 | 4 | 4 |
| | C4_3 | 814-839 | 1 | 2 | 3 | 4 | 4 | 4 | 4 | 4 |
| 5 | C5_1 | 840-923 | 1 | 1 | 1 | 1 | 5 | 5 | 5 | 5 |
| | C5_2 | 924-1007 | 1 | 2 | 2 | 2 | 5 | 5 | 5 | 5 |
| | C5_3 | 1008-1021 | 1 | 2 | 3 | 3 | 5 | 5 | 5 | 5 |
| | C5_4 | 1022-1049 | 1 | 2 | 3 | 4 | 5 | 5 | 5 | 5 |
| 6 | C6_1 | 1050-1105 | 1 | 1 | 1 | 1 | 1 | 6 | 6 | 6 |
| | C6_2 | 1106-1161 | 1 | 2 | 2 | 2 | 2 | 6 | 6 | 6 |
| | C6_3 | 1162-1217 | 1 | 1 | 3 | 3 | 3 | 6 | 6 | 6 |
| | C6_4 | 1218-1243 | 1 | 2 | 2 | 4 | 4 | 6 | 6 | 6 |
| | C6_5 | 1244-1259 | 1 | 2 | 3 | 4 | 5 | 6 | 6 | 6 |
| 7 | C7_1 | 1260-1299 | 1 | 1 | 1 | 1 | 1 | 1 | 7 | 7 |
| | C7_2 | 1300-1339 | 1 | 2 | 2 | 2 | 2 | 2 | 7 | 7 |
| | C7_3 | 1340-1379 | 1 | 1 | 3 | 3 | 3 | 3 | 7 | 7 |
| | C7_4 | 1380-1419 | 1 | 2 | 2 | 4 | 4 | 4 | 7 | 7 |
| | C7_5 | 1420-1459 | 1 | 2 | 3 | 3 | 5 | 5 | 7 | 7 |
| | C7_6 | 1460-1469 | 1 | 2 | 3 | 4 | 5 | 6 | 7 | 7 |
| 8 | C8_1 | 1470-1499 | 1 | 1 | 1 | 1 | 1 | 1 | 1 | 8 |
| | C8_2 | 1500-1529 | 1 | 2 | 2 | 2 | 2 | 2 | 2 | 8 |
| | C8_3 | 1530-1559 | 1 | 1 | 3 | 3 | 3 | 3 | 3 | 8 |
| | C8_4 | 1560-1589 | 1 | 2 | 2 | 4 | 4 | 4 | 4 | 8 |
| | C8_5 | 1590-1619 | 1 | 2 | 3 | 3 | 5 | 5 | 5 | 8 |
| | C8_6 | 1620-1649 | 1 | 2 | 3 | 4 | 4 | 6 | 6 | 8 |
| | C8_7 | 1650-1679 | 1 | 2 | 3 | 4 | 5 | 6 | 7 | 8 |

FIG. 21

DATA FINGERPRINT DISTRIBUTION ON A DATA STORAGE SYSTEM

RELATED APPLICATIONS

This application is a continuation of U.S. application Ser. No. 15/884,519 filed Jan. 31, 2018 now U.S. Pat. No. 10,303,365 which is hereby incorporated by reference.

BACKGROUND

Technical Field

This application generally relates to data storage and more particularly to techniques used in connection with data deduplication.

Description of Related Art

Data deduplication or "dedupe" reduces the amount of data stored in a data storage system by determining identical (or presumably identical) portions of data stored, or intended to be stored, in the data storage system, and only storing a single instance of the data portion "to disk"—i.e., persisting in non-volatile memory, e.g., tape, disk or solid state, of the data storage system. In post-process deduplication, these identical data portions are determined after the data is stored to disk. In in-line deduplication, these identical portions are determined before the data including the identical portion is stored to disk.

To determine identical data portions, digital fingerprints (hereinafter "fingerprints") of data portions are generated, and compared to previously generated fingerprints. A fingerprint serves as an identifier of data having a fixed size that is less than the size of the data itself, desirably much less in size. A fingerprint may be generated by applying a hash function to data, for example, Message Digest 5 (MD5), Secure Hash Algorithm 1 (SHA-1), SHA-2 or SHA-256, etc., to produce a hash value or digest of the data. This hash value then may be stored in an entry of a hash table, for example, in volatile memory of the data storage system, along with an indication of the location at which the actual data is stored within the data storage system, e.g., on disk. This hash value then may be compared to future generated hash values to determine whether there is a match, in which case, rather than storing the data from which the hash value was generated to disk, a reference (e.g., pointer) to the hash entry in the hash table may be maintained.

The granularity at which data is deduplicated—i.e., the size of the data portions to be fingerprinted and compared—can vary. The more granular the deduplication, the greater the likelihood of a match (i.e., a collision), and thus the greater the reduction of data stored to disk. However, as the granularity of deduplication increases, so does the number of fingerprints that must be stored in non-volatile memory, and the number of fingerprints that must be generated and compared, consuming more system resources. Considering that some of today's larger storage systems can store up to several petabytes (PB) of data, where $1 \text{ PB}=10^{15}$ bytes, the amount of system resources that are consumed for deduplication can be considerable. For example, in an 8 PB system, if the granularity of deduplication is 128 KB—i.e., fingerprints are generated for 128 KB portions of data, the potential number of fingerprints is 8 billion.

Some data storage systems include multiple storage controllers that control the processing of I/O between the non-volatile storage media (e.g., drives) and host systems, including the processing of I/O itself and possibly some of the management of the data storage system associated therewith. As used herein, a "storage controller" or "controller" is a discrete control unit that controls processing of I/O in a data storage system. A controller may include one or more components that themselves may be considered controllers. For example, Symmetrix®, VMAX® and VMAX3® systems (hereinafter referred to generally as VMAX storage systems) made available from Dell EMC may include multiple engines, each of which may be considered a controller, each engine including two directors, each director being a discrete control unit that may be considered a controller. While there may be a global memory shared by all controllers in such multi-controller systems, each controller or group of controllers may have its own dedicated local memory.

In such multi-controller storage systems, given the resources consumed in implementing data deduplication, it may be desirable to distribute deduplication processing across controllers that are active—i.e., those that have been configured and are actually in use. However, each time an active controller is added to a data storage system, it may be desirable to redistribute the deduplication processing across the active controllers. This redistribution itself may consume significant system resources, during which time data deduplication may not be available, further degrading system performance.

What is desired is a data storage system that can balance deduplication processing across multiple active controllers, and, in response to a new active controller being added, redistribute deduplication processing in an efficient manner that minimizes utilization of system resources.

SUMMARY OF THE INVENTION

In some embodiments of the system described herein, for a data storage system in which fingerprints are determined for data portions of a predetermined size, the data storage system including one or more of a potential number of active storage controllers, a method includes grouping potential fingerprints into a plurality of fingerprint groups, and, for each of the plurality of fingerprint groups, for each of the potential number of active storage controllers in the data storage system, determining a storage controller that owns the fingerprint group. The method further includes determining a number of active storage controllers, and, for at least each fingerprint determined for a data portion stored in the data storage system, storing the fingerprint in a fingerprint table of fingerprints in a local memory of a storage controller determined to own, for the determined number of active controllers, the fingerprint group to which the fingerprint belongs. The method may further include populating a second table including a plurality of entries, each entry corresponding to one or more fingerprint groups and specifying, for each of the potential number of active storage controllers, the storage controller determined to own the fingerprint group. The plurality of entries of the second table may not change in response to adding another active storage controller of the potential number of active storage controllers to the data storage system. The method may further include receiving a first data portion, determining a first fingerprint of the data portion, determining, using the second table, a first active storage controller of the plurality of storage controllers that owns the first fingerprint, and using a first fingerprint table in the local memory of the first active storage controller to perform deduplication processing of the first data portion. The method may further include, in response to adding an active storage controller of the potential number of active storage controllers to the data storage system, moving one or more of the at least each fingerprint determined for a data portion from the first table to a second table of fingerprints in a local memory of the added storage controller determined to own the one or more fingerprints, where no fingerprints are moved between any storage controllers that already were active prior to the adding of the active storage controller. The method may further include, in response to adding an active storage controller of the potential number of active storage controllers to the data storage system, moving one or more of the at least each fingerprint determined for a data portion from the first table to a second table of fingerprints in a local memory of the added storage controller determined to own the one or more fingerprints, where a maximum percentage of fingerprints that are moved between any active storage controllers as a result of the adding of the active storage controller is: 100/x, wherein x is a number of active storage controllers on the data storage system after the adding of the active controller. The method may further include determining a quantity of fingerprint groups to be a lowest common multiple of each potential number of active storage controllers or a multiple thereof. Fingerprints may be generated for the data portions using SHA-2 and/or a hash function that produces a random distribution of fingerprint values in a space of possible fingerprint values.

In some embodiments of the system described herein, a data storage system is provided in which fingerprints are determined for data portions of a predetermined size. The data storage system includes one or more of a potential number of active storage controllers, one or more processors, and a memory including code stored thereon that, when executed, performs a method. The method includes grouping potential fingerprints into a plurality of fingerprint groups, and, for each of the plurality of fingerprint groups, for each of the potential number of active storage controllers in the data storage system, determining a storage controller that owns the fingerprint group. The method further includes determining a number of active storage controllers, and, for at least each fingerprint determined for a data portion stored in the data storage system, storing the fingerprint in a fingerprint table of fingerprints in a local memory of a storage controller determined to own, for the determined number of active controllers, the fingerprint group to which the fingerprint belongs. The method may further include populating a second table including a plurality of entries, each entry corresponding to one or more fingerprint groups and specifying, for each of the potential number of active storage controllers, the storage controller determined to own the fingerprint group. The plurality of entries of the second table may not change in response to adding another active storage controller of the potential number of active storage controllers to the data storage system. The method may further include receiving a first data portion, determining a first fingerprint of the data portion, determining, using the second table, a first active storage controller of the plurality of storage controllers that owns the first fingerprint, and using a first fingerprint table in the local memory of the first active storage controller to perform deduplication processing of the first data portion. The method may further include, in response to adding an active storage controller of the potential number of active storage controllers to the data storage system, moving one or more of the at least each fingerprint determined for a data portion from the first table to a second table of fingerprints in a local memory of the added storage controller determined to own the one or more fingerprints, where no fingerprints are moved between any storage controllers that already were active prior to the adding of the active storage controller. The method may further include, in response to adding an active storage controller of the potential number of active storage controllers to the data storage system, moving one or more of the at least each fingerprint determined for a data portion from the first table to a second table of fingerprints in a local memory of the added storage controller determined to own the one or more fingerprints, where a maximum percentage of fingerprints that are moved between any active storage controllers as a result of the adding of the active storage controller is: 100/x, wherein x is a number of active storage controllers on the data storage system after the adding of the active controller. The method may further include determining a quantity of fingerprint groups to be a lowest common multiple of each potential number of active storage controllers or a multiple thereof. Fingerprints may be generated for the data portions using SHA-2 and/or a hash function that produces a random distribution of fingerprint values in a space of possible fingerprint values.

In some embodiments of the system described herein, a non-transitory computer-readable medium is provided having software stored thereon for a data storage system in which fingerprints are determined for data portions of a predetermined size, the data storage system including one or more of a potential number of active storage controllers. The software includes executable code that groups potential fingerprints into a plurality of fingerprint groups, and executable code that, for each of the plurality of fingerprint groups, for each of the potential number of active storage controllers in the data storage system, determines a storage controller that owns the fingerprint group. The software further includes executable code that determines a number of active storage controllers, and executable code that, for at least each fingerprint determined for a data portion stored in the data storage system, stores the fingerprint in a fingerprint table of fingerprints in a local memory of a storage controller determined to own, for the determined number of active controllers, the fingerprint group to which the fingerprint belongs. The software may further include executable code that populates a second table including a plurality of entries, each entry corresponding to one or more fingerprint groups and specifying, for each of the potential number of active storage controllers, the storage controller determined to own the fingerprint group. The software may further include executable code that receives a first data portion, executable code that determines a first fingerprint of the data portion, executable code that determines, using the second table, a first active storage controller of the plurality of storage controllers that owns the first fingerprint, and executable code that uses a first fingerprint table in the local memory of the first active storage controller to perform deduplication processing of the first data portion. The software may further include executable code that, in response to adding an active storage controller of the potential number of active storage controllers to the data storage system, moves one or more of the at least each fingerprint determined for a data portion from the first table to a second table of fingerprints in a local memory of the added storage controller determined to own the one or more fingerprints, where no fingerprints are moved between any storage controllers that already were active prior to the adding of the active storage controller. The software may further include executable code that, in response to adding an active storage controller of the potential number of active storage controllers to the data storage system, moves one or more of the at least each fingerprint determined for a data portion from the first table to a second table of fingerprints in a local memory of the added storage controller determined to own the one or more fingerprints, wherein a maximum percentage of fingerprints that are moved between any active storage controllers as a result of the adding of the active storage controller is: 100/x, wherein x is a number of active storage controllers on the data storage system after the adding of the active controller.

BRIEF DESCRIPTION OF THE DRAWINGS

Features and advantages of the present invention will become more apparent from the following detailed description of illustrative embodiments thereof taken in conjunction with the accompanying drawings in which:

FIG. 11 is a table illustrating an example of the assignment of sub-chunks of a non-active controller to six active controllers according to embodiments of the system described herein;

FIG. 16 illustrates an example of a fingerprint group ownership table according to embodiments of the system described herein;

FIG. 21 illustrates an example of a fingerprint group ownership table, including chunk and sub-chunk identifiers, according to embodiments of the system described herein;

DETAILED DESCRIPTION OF EMBODIMENTS

Figure 1:
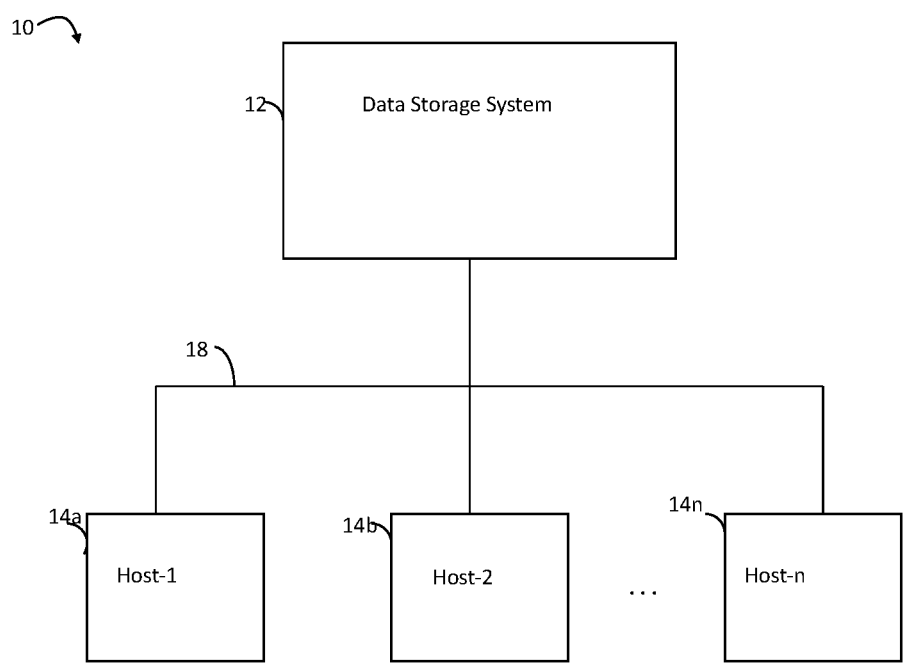
FIG. 1 is a block diagram illustrating an example of a system according to embodiments of the system described herein.

Described herein is a system and methods in which fingerprints are distributed in a balanced manner across active controllers of a data storage system, and may be done so in such a manner that, when a new active controller is added to the system, fingerprint ownership and movement between pre-existing active controllers, and active controllers overall, is minimized. In some embodiments, when a new active controller is added to the system and fingerprints are redistributed, no fingerprint ownership is re-assigned between pre-existing active controllers and no fingerprints are moved between pre-existing active controllers.

In multi-controller storage systems, to distribute deduplication processing across active controllers, it may be desirable to divide up ownership of the number of potential fingerprints between the active controllers, and store them in respective fingerprint tables, e.g., hash tables, of the storage active controllers, e.g., in local memory thereof, and have the respective active controller perform the deduplication processing for the fingerprints it owns, including determining (e.g., "looking up") matches (i.e., collisions) and proceeding accordingly. For such distributed deduplication, it may be desirable to balance the distribution of fingerprint ownership to balance resource consumption across the storage system. For example, the number of potential fingerprint values may be distributed as evenly as possible among the active controllers. However, if the number of active controllers changes, for example, an existing non-active controller is added, or a new controller added and activated, the ownership of fingerprints may need to be redistributed to maintain balance. This redistribution results in fingerprint ownership being assigned to the new active controller and fingerprints being moved to the hash table of the new active controller. This distribution also may result in the ownership of many fingerprints being reshuffled among controllers that were already active before the addition of the new active controller ("pre-existing active controllers") and fingerprints being moved between pre-existing active controllers, for example, between the hash tables in local memory of each of these controllers. For larger storage systems, for example, those having several petabytes or even more, billions of fingerprints may need to be moved between controllers. Moving this many fingerprints may consume substantial system resources.

Even if a multi-controller storage system were capable of being configured to provide deduplication across all controllers, i.e., system-wide deduplication, system administrators may decide not to do so because the above-described resource cost of maintaining balanced deduplication resource allocation among a potentially changing number of active controllers. Rather, such systems may be configured, by the manufacturer and/or system administrator, to perform deduplication on a controller-by-controller basis. That is, each controller may perform deduplication only for a pre-defined set of storage resources (e.g., one or more storage devices), in which case its hash table would apply only to data that is specific to those storage resources. In such systems, the benefits of deduplication are not fully realized, as different storage resources for which different controllers perform deduplication may each store a separate instance of the same data.

What is desired is a data storage system that can balance deduplication processing across multiple controllers in such a way as to reduce consumption of system resources when an active controller is added, such that the re-assignment of the ownership of fingerprints among active controllers, and thus the movement of the location at which fingerprints are stored (e.g., between local memories of active controllers) is minimized, thereby making system-wide data deduplication a more attractive, viable deduplication option. Described herein, in various embodiments, is a system that provides such a data storage system. By using embodiments of the system described herein, resources of the data storage system for performing deduplication may be conserved, and utilized for other purposes, resulting in an improved, more efficient data storage system. As is described in more detail herein, in some embodiments of the invention, the conservation of system resources as a result of active controllers being added may increase in comparison to alternative solutions as the number of active controllers increases. That is, for embodiments of the system described herein, economies of scale may be realized as the number of active controllers increases.

Referring now to FIG. 1, shown is an example of an embodiment of a system 10 according to some embodiments of the system described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Communication media that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
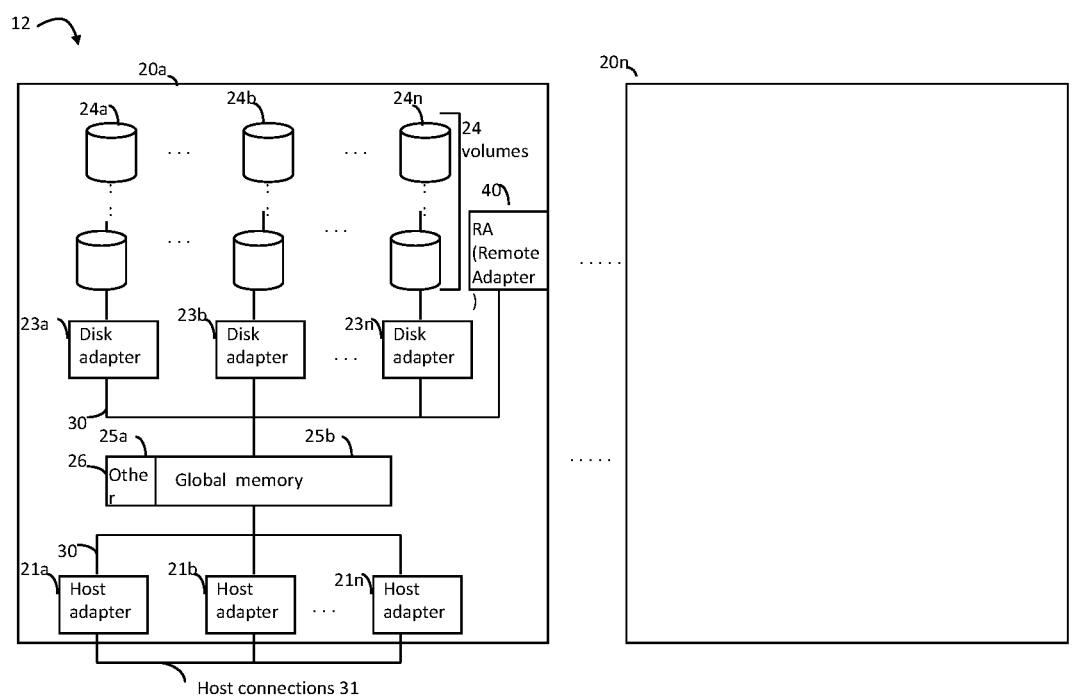
FIG. 2A is a block diagram illustrating an example of a data storage system according to embodiments of the system described herein.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
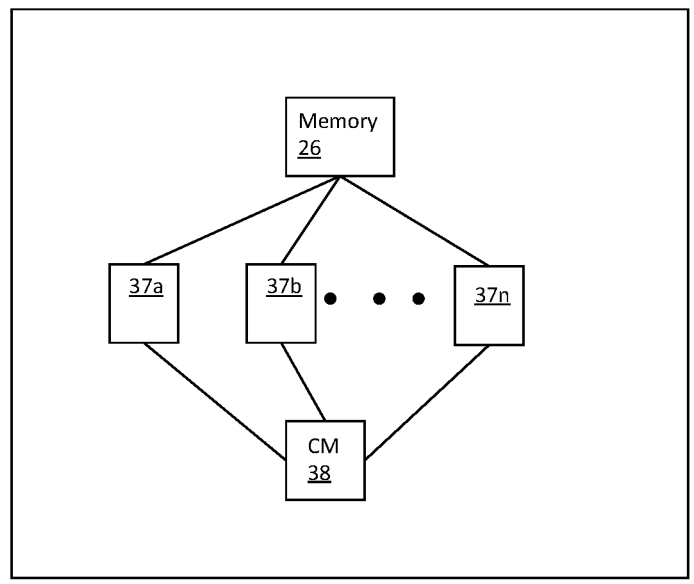
FIG. 2B is a block diagram illustrating an example of logical internal communications between directors and memory of the data storage system of FIG. 2A according to embodiments of the system described herein.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
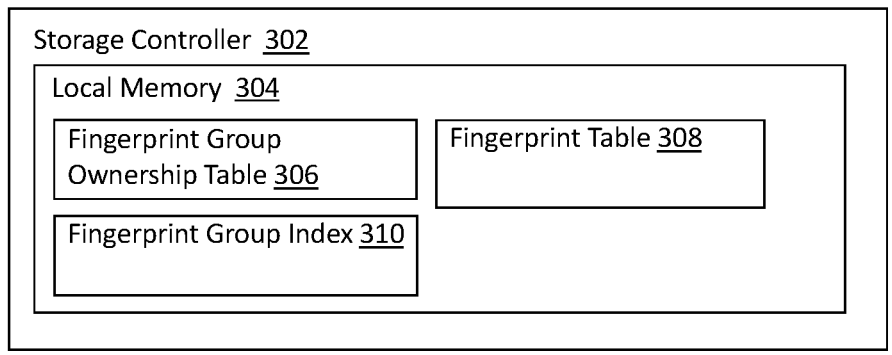
FIG. 3 is a block diagram illustrating an example of a storage controller according to embodiments of the system described herein.

FIG. 3 is a block diagram illustrating an example of a storage controller 300 according to embodiments of the system described herein. Other embodiments of a storage controller, for example, variations of controller 300, are possible and are intended to fall within the scope of the invention. In some embodiments, storage controller 302 may be a director 37a-37n described above in relation to FIG. 2B or an engine of a VMAX storage system including two directors. Storage controller 302 may include a local memory 304, which may be dedicated to the controller or a group of controllers. For example, in a VMAX storage system, local memory 304 may be dedicated to a director, or an engine that includes two directors. Local memory 304 may include a fingerprint group ownership table 306, fingerprint (e.g., hash) table 308 and a fingerprint group index 310, each of which is described in more detail elsewhere herein, including in relation to FIGS. 16 and 17, and step 512 of FIG. 5.

Figure 4:
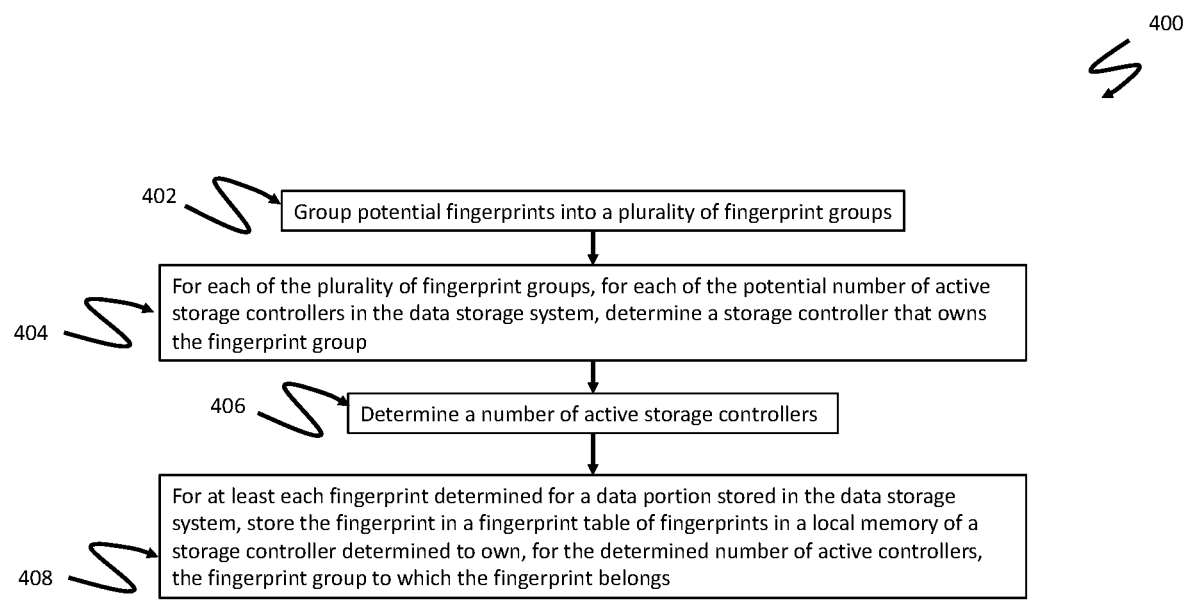
FIG. 4 is a flow chart illustrating an example of a method of distributing fingerprints among a plurality of active controllers in a data storage system according to embodiments of the system described herein.

FIG. 4 is a flow chart illustrating an example of a method 400 of distributing fingerprints among a plurality of active controllers in a data storage system according to embodiments of the system described herein, for example, the data storage system described in relation to FIGS. 1-3.

Other embodiments of a method of distributing fingerprints among a plurality of active controllers, for example, variations of method 400, are possible and are intended to fall within the scope of the invention. Method 400 may be performed for a data storage system in which fingerprints are determined for data portions of a predetermined size (e.g., 128K, as described below in more detail), the data storage system including one or more of a potential number of active storage controllers.

In step 402, potential fingerprints may be grouped into a plurality of fingerprint groups, for example, as described below in relation to step 502 of method 500 in connection with FIG. 5. In step 404, for each of the plurality of fingerprint groups, for each of the potential number of active storage controllers in the data storage system, a storage controller that owns the fingerprint group may be determined, for example, as described below in relation to step 504 of method 500 in connection with FIG. 5. In step 406, a number of active storage controllers in the data storage system may be determined, and, in step 408, for at least each fingerprint determined for a data portion stored in the data storage system, the fingerprint may be stored in a fingerprint table of fingerprints in a local memory of a storage controller determined to own, for the determined number of active controllers, the fingerprint group to which the fingerprint belongs. Steps 406 and 408 may be performed as described below in relation to method 1800 in connection with FIG. 18.

Figure 5:
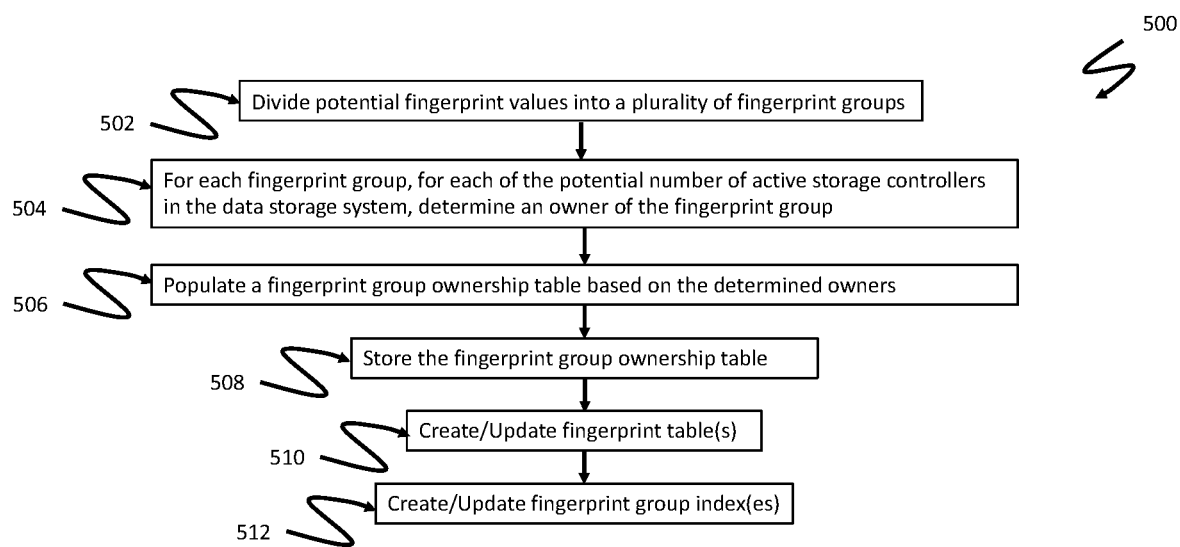
FIG. 5 is a flow chart illustrating an example of a method of establishing ownership of fingerprints for potential number of storage controllers according to embodiments of the system described herein.

FIG. 5 is a flow chart illustrating an example of a method 500 of establishing ownership of fingerprints for potential numbers of storage controllers according to embodiments of the system described herein. Other embodiments of a method of establishing ownership of fingerprints for potential numbers of controllers, for example, variations of method 500 are possible and are intended to fall within the scope of the invention. Throughout the following description of methods 500 and 900, an example of a VMAX storage system including up to 8 active controllers (i.e., engines) will be used for illustrative purposes, such that the potential number of active controllers in this example is 1, 2, 3, 4, 5, 6, 7 or 8.

In step 502, potential fingerprint values may be divided into a plurality of fingerprint groups. In some embodiments, the number (i.e., quantity) of fingerprint groups is selected to ensure that the fingerprint groups may be divided evenly among any potential number of active controllers. For example, the number of fingerprint groups may be set to be a lowest common multiple (LCM) of each potential number of active controllers, or any multiple thereof, or the LCM of a multiple of each potential number of active controllers. It may be desirable to choose a multiple of the LCM to enable even further granularity for balancing deduplication processing in a data storage system. It may be desirable to choose an LCM of a multiple of each potential number of active controllers if each controller itself includes a multiple number of discrete control units, to enable balancing deduplication processing among the multiple discrete control units of the controller. For example, a VMAX storage system including 8 engines, may have two discrete control units; i.e., directors. Thus, it may be desirable to use an LCM of a 2*(each potential number of active controllers)=LCM of 2*(1, 2, 3, 4, 5, 6, 7, 8)=LCM of 2, 4, 6, 8, 10, 12, 14 and 16=1680. It should be appreciated that, in some embodiments of the inventor, each director itself could be considered a controller, and the determination of fingerprint ownership determined accordingly.

As will defined in more detail below in relation to FIG. 18, for each fingerprint, a fingerprint group value of a fingerprint may be determined by performing modulo LCM on the fingerprint or a portion thereof. For example, in the case of an 8-engine VMAX storage system, a fingerprint group value may be determined by calculating: (fingerprint or portion thereof) modulo 1680. Thus, the members of a fingerprint group may be all fingerprints for which modulo LCM (e.g., 1680) of the fingerprint or a portion thereof produces a same result, the fingerprint group value.

In some embodiments, the algorithm (e.g., hash function) used to produce fingerprints (e.g., hash values) generates random values within the fingerprint space; i.e., among the possible fingerprint values. For example, SHA-2 or a variation thereof may be used. In such embodiments, fingerprint groups determined by performing modulo LCM of potential numbers of active controllers represent a balanced distribution of potential fingerprint values. Further, if such an algorithm is used, and fingerprint groups are determined using the modulo operation described above, then if the potential value of a fingerprint or fingerprint portion on which the modulo LCM operation is performed is a multiple of the LCM, then the fingerprint groups represent an even distribution of potential fingerprint values; i.e., each fingerprint group represents an equal number of fingerprints within the fingerprint space.

In step 504, for each fingerprint group, for each of the potential number of active controllers in the data storage system, an owner of the fingerprint group may be determined. In some embodiments, such ownership may be determined by execution of the following equation:

Fingerprint Owner=(fingerprint group number) mod (# active controllers). Equation 1:

In Equation 1, the fingerprint group number is a value representing a fingerprint group. For example, if there are 840 fingerprint groups, each fingerprint group may have a number from 1-840. As noted above, the number of fingerprint groups may be determined as an LCM of the potential number of controllers, so that execution of Equation 1 will result in an even distribution of fingerprint groups across active controllers, and thus a balanced distribution (potentially even distribution—if the potential value of a fingerprint or fingerprint portion on which the modulo LCM operation is performed is a multiple of the LCM as described above) of potential fingerprint values across active controllers.

It should be appreciated that, in some embodiments, rather than establishing fingerprint groups, and performing modulo operations on the fingerprint group numbers to determine controller ownership, controller ownership can be determined by performing modulo operations on the fingerprints (e.g., hash values) directly, e.g., by applying Equation 2, which also results in a balanced distribution of fingerprints, and an even distribution if the number of potential values of the fingerprints of portions thereof is a multiple of the number of active controllers.

$$\text{Fingerprint Owner}=(\text{fingerprint or portion thereof}) \bmod (\text{\# active controllers}). \quad \text{Equation 2:}$$

Further, in some embodiments, as an alternative to pre-determining controller ownership of fingerprints for potential numbers of active controllers, fingerprint ownership can be determined in response to an active controller being added, and fingerprints moved between controllers accordingly. The following examples are for embodiments in which controller ownership is predetermined using fingerprint groups.

Figure 6:
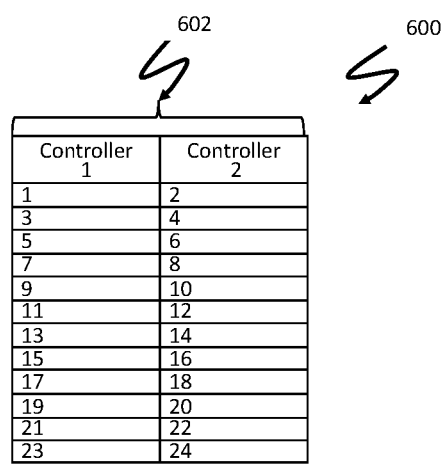
FIG. 6 is a table illustrating an example of distributed ownership of fingerprint groups among two active storage controllers according to embodiments of the system described herein.

Consider application of Equation 1 to a system in which the potential number of active controllers is 2, 4 or 6, and the number of fingerprint groups is chosen to be a multiple (2) of the LCM of 2, 4, 6. The LCM of 2, 4, 6 is 12, and thus the number of fingerprint groups is set at 24 (2*12). For the potential number of active controllers=2, fingerprint groups may be assigned as illustrated in table 600, in which each column of columns 602 represents a controller, and the numerical values in each column represent the fingerprint groups assigned to the controller for the case when number of active controller=2. As illustrated in FIG. 6, the fingerprint groups are evenly distributed amongst the controllers such that, in the case when there are two controllers in the storage system, fingerprint ownership is balanced amongst the two controllers, and thus storage of fingerprints amongst the two controllers (e.g., in a hash tables of local memories) is balanced.

Figure 7:
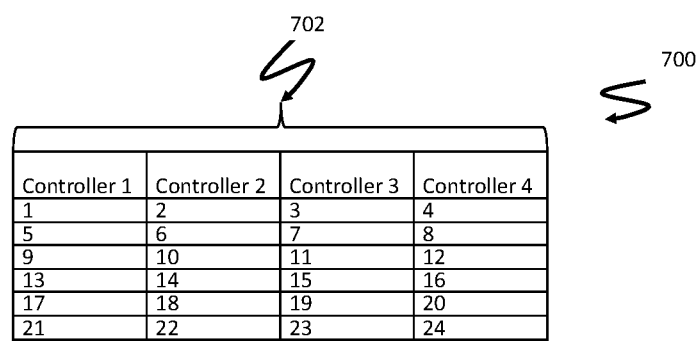
FIG. 7 is a table illustrating an example of distributed ownership of fingerprint groups among four active storage controllers according to embodiments of the system described herein.

Table 700 in FIG. 7 illustrates fingerprint group ownership when the potential number of active controllers=4, in which each column of columns 702 represents a controller, and the numerical values in each column represent the fingerprint groups assigned to the controller for the case when number of active controllers=4. As illustrated in FIG. 7, the fingerprint groups are evenly distributed amongst the controllers such that, in the case when there are four controllers in the storage system, fingerprint ownership is balanced amongst the four controllers, and thus storage of fingerprints amongst the four controllers (e.g., in a hash tables of local memories) is balanced.

Tables 600 and 700 illustrate that, in the event that the number of active storage systems is increased from 2 to 4, ownership of fingerprint groups 3, 7, 11, 15, 19 and 23 and the underlying fingerprints of these groups are moved from pre-existing active controller 1 to new active controller 3, and ownership of fingerprint groups 4, 8, 12, 16, 20, 24 and the underlying fingerprints are moved from pre-existing active controller 2 to new active controller 4. There is no movement of fingerprint group ownership or fingerprints between pre-existing active controllers 1 and 2. Further, 50% of the fingerprint groups, and thus fingerprints, were moved from pre-existing active controllers 1 and 2 to new active controllers 3 and 4.

Figure 8:
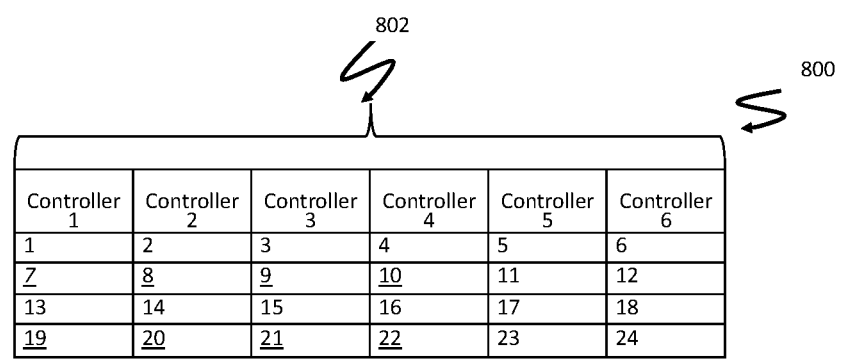
FIG. 8 is a table illustrating an example of distributed ownership of fingerprint groups among six active storage controllers according to embodiments of the system described herein.

Table 800 in FIG. 8 illustrates fingerprint group ownership when the potential number of active controllers=6, in which each column 802 represents a controller, and the numerical values in each column represent the fingerprint groups assigned to the controller for the case when number of active controllers=6. As illustrated in FIG. 8, the fingerprint groups are evenly distributed amongst the controllers such that, in the case when there are six controllers in the storage system, fingerprint ownership is balanced amongst the six controllers, and thus storage of fingerprints amongst the six controllers (e.g., in a hash tables of local memories) is balanced.

Tables 700 and 800 illustrate that, in the event that the number of active storage systems is increased from 4 to 6, ownership of fingerprint groups 5, 6, 11, 12, 17, 18, 23 and 24 and the underlying fingerprints of these groups are moved from a pre-existing active controller to a new active controller 3. Also, unlike the case of going from 2 to 4 active controllers, in which no ownership was moved between pre-existing active controllers, when going from 4 to 6 active controllers, fingerprint groups 7-10 and 19-22 (shown in underline in FIG. 800), and the underlying fingerprints, are moved between (i.e., reshuffled between) pre-existing active controllers 1-4. Thus, 50% of the fingerprint groups, and thus fingerprints, owned by pre-existing active processors, are moved, and 67% of the all fingerprint groups, and thus fingerprints, are moved.

When using Equation 1 to assign ownership of fingerprints for different numbers of active controllers, the amount (e.g., percent) of reshuffling between pre-existing active controllers, and overall movement, increases as the number of controllers increases. For example, when going from 14-16 active controllers, 75% of the fingerprint groups, and thus fingerprints, owned by pre-existing active processors, are moved, and 87.5% of all fingerprint groups, and thus fingerprints, are moved. Consider the example of an 8 PB data storage system, for which fingerprints are generated at the granularity of 128 KB, resulting in 8 billion fingerprints. In this example, when going from 14 to 16 controllers, 7 billion fingerprints potentially would be moved. Movement of this many fingerprints may cause the data storage system to run in a degraded state for a prolonged period of time long time because without fingerprints available, deduplication cannot be performed. Further, movement or such large number of fingerprints may cause much traffic, potentially further degrading system performance. For example, in a VMAX system, this traffic may consume bandwidth of internal fabric of a VMAX engine.

While application of Equations 1 or 2 above will result in balanced deduplication across multiple active controllers of a storage system, it may be desirable to reduce the amount (e.g., the percentage) of fingerprints that are moved when a new active controller is added to the storage system, in particular between pre-existing active controllers.

In some embodiments of the system described herein, an owner of each fingerprint group may be determined for each of the potential number of active controllers in the data storage system in accordance with method 900 described below in relation to FIG. 9. By determining such ownership as described in method 900, when a new active controller is added to the system and fingerprints are redistributed, no fingerprint ownership is re-assigned between pre-existing active controllers and no fingerprints are moved between pre-existing active controllers.

Figure 9:
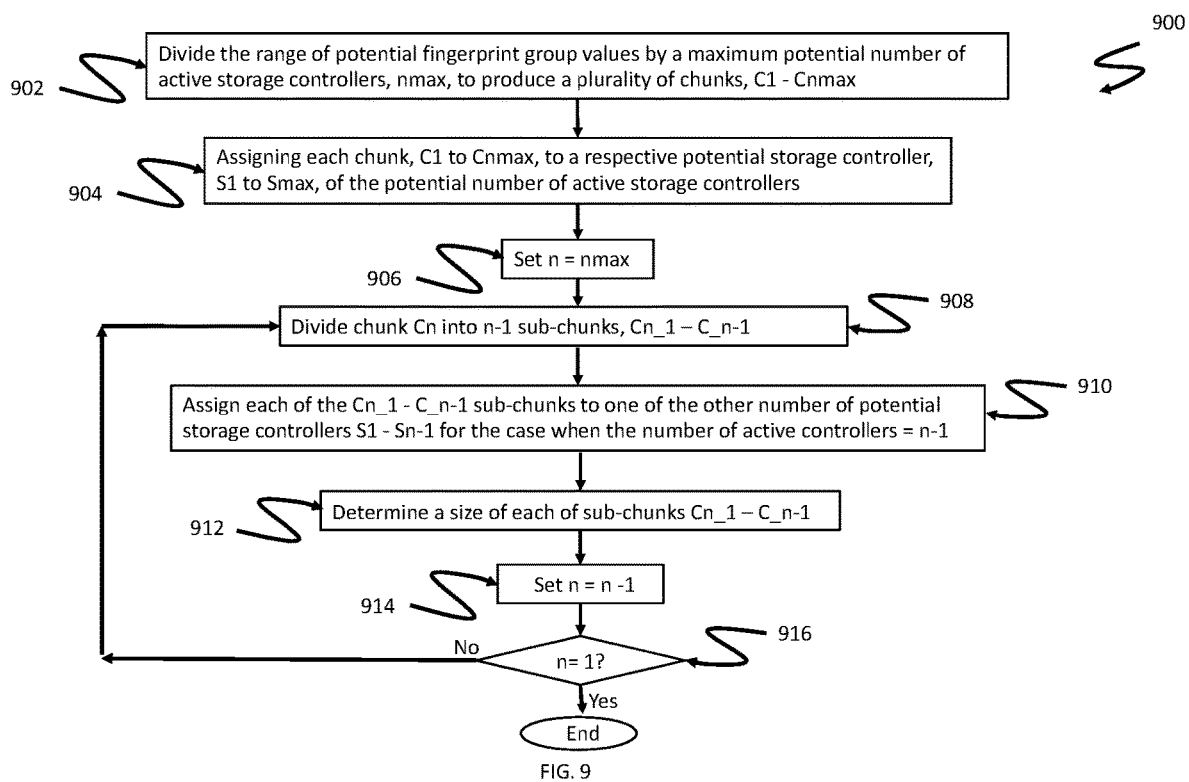
FIG. 9 is a flow chart illustrating an example of a method of assigning ownership of fingerprint groups to potential numbers of storage controllers according to embodiments of the system described herein.

FIG. 9 is a flow chart illustrating an example of a method 900 of assigning ownership of fingerprint groups to potential numbers of controllers according to embodiments of the system described herein. Other embodiments of a method of assigning ownership of fingerprint groups to potential numbers of controllers, for example, variations of method 900, are possible and are intended to fall within the scope of the invention.

In step 902, the range of potential fingerprint group values may be divided by a maximum potential number of active controllers, nmax, to produce a plurality of chunks, C1–Cnmax. Each chunk is a subset of the range of potential fingerprint group values, and includes a plurality of fingerprint groups. For example, in the case of an 8-engine VMAX storage system, fingerprint group values may be divided into chunks C1-C8.

In step 904, each chunk, C1 to Cnmax, may be assigned to a respective potential controller, S1 to Snmax, of the potential number of active controllers, for the case when the number of controllers=nmax. The potential controller to which a chunk may be associated in step 904 may be considered the primary controller of the chunk, which is the controller to which the chunk will be assigned if all of the potential number of active controllers are active. For example, in the case of an 8-engine VMAX storage system, chunks C1-C8 may be assigned to potential controllers S1-S8, respectively. The size of each of chunks C1-C8 may be set to be the same so that the number of fingerprint groups are balanced across active controllers for the case of n=nmax. For example, in the case of an 8-engine VMAX storage system, in which the number of fingerprint groups is 1680, the size of chunks C1-C8 may be set to 1680/8=210 fingerprint groups.

Following step 904, the assignments of fingerprint groups for cases in which the number of active controllers is less than the maximum number of active controllers, i.e., n=1 through n=nmax-1 may be determined, for example, by performance of steps 906-916, including the iterative performance of steps 908-916.

In step 906, the variable representing a number of active controllers, n, may be set equal to nmax. Next, in step 908, chunk Cn may be divided into n-1 sub-chunks $Cn\_1$-$Cn-1$. Each sub-chunk is a subset of a chunk, and includes a plurality of fingerprint groups. For example, in the case of an 8-engine VMAX storage system, chunk C8 may be divided into sub-chunks $C8\_1$-$C8\_7$.

In step 910, each of the $Cn\_1$-$C\_n-1$ sub-chunks may be assigned to one of the other number of potential controllers S1-Sn-1 for the case when the number of active controllers=n-1. For example, in the case of an 8-engine VMAX storage system, sub-chunks $C8\_1$-$C8\_7$, may be assigned to potential controllers S1-S7, respectively. In some embodiments, any of a variety of sub-chunk assignments may be employed in each iteration of step 910, as long as the following condition ultimately is met: when a new active controller is added, these assignments result in no fingerprints being reassigned to pre-existing active controllers, such that no fingerprints are moved between pre-existing active controllers.

Figure 10:
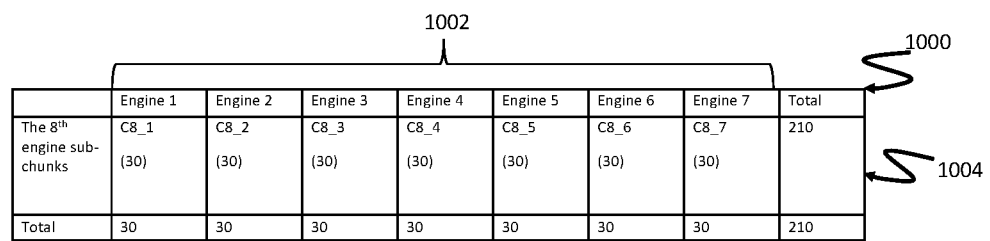
FIG. 10 is a table illustrating an example of the assignment of sub-chunks of a non-active controller to seven active controllers according to embodiments of the system described herein.
Figure 12:
FIG. 12 is a table illustrating an example of the assignment of sub-chunks of a non-active controller to five active controllers according to embodiments of the system described herein.
Figure 13:
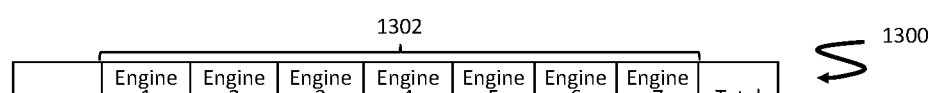
FIG. 13 is a table illustrating an example of the assignment of sub-chunks of a non-active controller to four active controllers according to embodiments of the system described herein.
Figure 14:
FIG. 14 is a table illustrating an example of the assignment of sub-chunks of a non-active controller to three active controllers according to embodiments of the system described herein.
Figure 15:
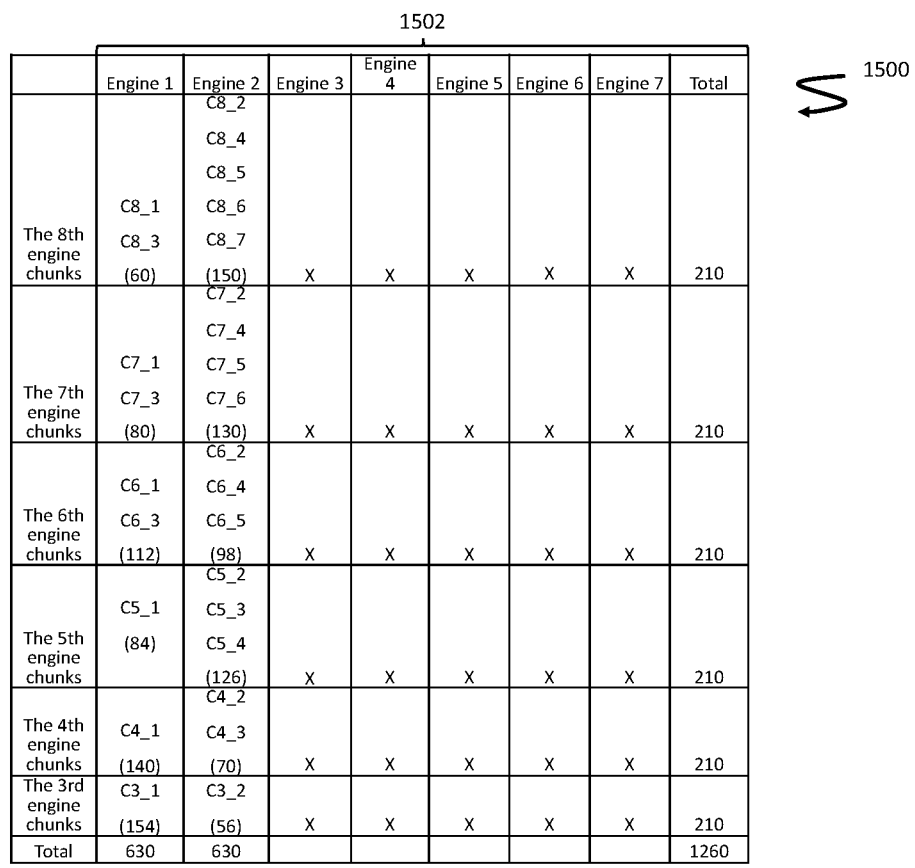
FIG. 15 is a table illustrating an example of the assignment of sub-chunks of a non-active controller to two active controllers according to embodiments of the system described herein.

In step 912, a size (i.e., the number of fingerprint groups) of each of sub-chunks $Cn\_1$-$C\_n-1$ may be determined, for example, to ensure that the number of fingerprint groups are balanced across active controllers for the case of n-1 active controllers. For example, in the case of an 8-engine VMAX storage system, for n-1=7 active controllers, in which sub-chunks $C8\_1$-$C8\_7$ may be assigned to potential controllers S1-S7, it may be desirable to ensure that the same number of storage groups are assigned to each of controllers S1-S7 (in addition to the fingerprint groups for which these controllers are primary controllers). In reference to table 1000 of FIG. 10, this equality may be achieved by ensuring that each of columns 1002 adds up to the same amount, and that the sum of the values in cells for columns 1002 in row 1004 for the 8th controller sub-chunks=the size of chunk C8=210. Thus, the size of each sub-chunk $C8\_x$ may be determined by solving the equations:

$$C8\text{-}1 = C8\_2 = C8\text{-}3 = C8\text{-}4 = C8\text{-}5 = C8\text{-}6 = C8\_7; \text{ and} \quad \text{Equation 3:}$$

$$C8\text{-}1 + C8\_2 + C8\text{-}3 + C8\text{-}4 + C8\text{-}5 + C8\text{-}6 + C8\text{-}7 = 210. \quad \text{Equation 4:}$$

The sizes of sub-chunks resulting from solving for Equations 3 and 4 is reflected in parentheses in each cell of row 1004. In this case, every sub-chunk has the same size=30 fingerprint groups. It should be appreciated that table 1000, and tables 1100 and 1500 described below in more detail, do not show the size of the chunks for which each active controller is the primary controller. For example, each of Engines 1-7 of FIG. 10 also have 210 fingerprint groups for which they are the primary controller and will own when active. As each engine has the same number of fingerprint groups for which it is the primary controller, it is not necessary to factor these fingerprint groups into calculations for determining fingerprint group ownership for potential numbers of active controllers.

In step 914, the variable n may be set equal to n-1, and in step 916 it may be determined whether n=1. If n #1, the method 900 may return to step 908, and steps 908-916 may be repeated until controller assignments have been determined for fingerprint groups for all potential number of controllers, n through nmax (assignment for n=nmax having been made in step 904). That is, if it determined in step 916 that n=1, method 900 may end.

The results of performance of steps 908-916 for an embodiment in which an 8-engine VMAX storage system is used are illustrated in tables 1000-1500 of FIGS. 10-15, respectively. Table 1000 represents the assignment of sub-chunks of Engine 8 to Engines 1-7 in the event that Engines 1-7 are active and Engine 8 is not active; i.e., in which 7 of 8 potential engines of the system are active. Table 1100 represents the assignment of sub-chunks of Engines 7 and 8 to Engines 1-6 in the event that Engines 1-6 are active and Engines 7 and 8 are not active; i.e., in which 6 of 8 engines are active. Table 1200 represents the assignment of sub-chunks of Engines 6-8 to Engines 1-5 in the event that Engines 1-5 are active and Engines 6-8 are not active; i.e., in which 5 of 8 potential engines of the system are active. Table 1300 represents the assignment of sub-chunks of Engines 5-8 to Engines 1-4 in the event that Engines 1-4 are active and Engines 5-8 are not active; i.e., in which 4 of 8 engines are active. Table 1400 represents the assignment of sub-chunks of Engines 4-8 to Engines 1-3 in the event that Engines 1-3 are active and Engines 4-8 are not active; i.e., in which 3 of 8 potential engines of the system are active. Table 1500 represents the assignment of sub-chunks of Engines 3-8 to Engines 1-2 in the event that Engines 1-2 are active and Engine 3-8 are not active; i.e., in which 2 of 8 engines are active.

In each of tables 1000-1500, each row represents the sub-chunks of a potential active engine (i.e., a controller), and each column (e.g., 1002-1502) represents a potential active engine that will own one or more fingerprint groups of the sub-chunks. The value appearing in parentheses in each cell represents the cumulative size (e.g., number of fingerprint groups) of the sub-chunks listed in the cell, which would be assigned to the engine represented by the column for the number of active controllers corresponding to the table. A value of "X" reflects that the engine is not active, and thus no sub-chunks would be assigned thereto. These sub-chunk sizes are determined by solving equations for each $Cn\_x$ sub-chunk ensuring that each of the engine columns add up to the same amount, and that the sum of the cell values for each engine sub-chunk row=210. For example, in reference to table 1100 of FIG. 11, performance of step 912 for n-1=6 controllers, i.e., determining the size of each sub-chunk $C7\_x$, may include solving equation:

$$C7\text{-}1 + C8\text{-}1 = C7\text{-}2 + C8\text{-}2 = C7\text{-}3 + C8\text{-}3 = C7\_24 + C8\text{-}4 = C7\text{-}5 + C8\_5 = C7\_6 + C8\_6 + C8\_7 \quad \text{Equation 5:}$$

The values determined for C8_x can be plugged into Equation 5 to solve for the C7_x values, resulting in the values illustrated in table 1100. For each iteration of step 912, to determine the size of sub-chunks Cn_x, the sizes determined in the previous iteration for sub-chunks Cn+1_x can be used to help solve the equation.

Figure 20:
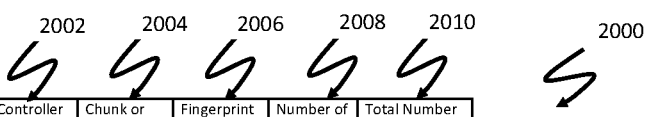
FIG. 20 is a table illustrating an example of chunk and sub-chunk sizes and fingerprint group ranges according to embodiments of the system described herein.

FIG. 20 is a table 2000 illustrating an example of chunk and sub-chunk sizes and fingerprint group ranges resulting from performance of steps 908-916 for an embodiment in which an 8-engine VMAX storage system, consistent with tables 1000-1500 of FIGS. 10-15. Column 2002 designates the controller chunk or sub-chunk. Column 2004 designates the chunk or sub-chunk. Column 2006 designates the range of fingerprint groups corresponding to the chunk or sub-chunk. Column 2010 designates the size of the chunk or sub-chunk; i.e., the number of fingerprint groups contained in the chunk. Column 2012 designates the total size of a chunk.

In some embodiments of the system described herein, rather than determine sub-chunk sizes during each iteration of steps 908-916 in step 912, the sub-chunk sizes may be determined after all sub-chunks have been assigned for each potential number of controllers, for example, by iterative performance of step 910.

Using the method 900, no fingerprint ownership will be moved between pre-existing active controllers when a new active controller is added. Further, the percentage of fingerprints that change ownership as a result of adding a new active controller to a storage system, while still maintaining a balanced distribution is minimized, equal to the amount that would need to be added to the new active controller to maintain deduplication balance, for example, an equal number of fingerprint groups assigned to each active controller. This percentage is 100/x, where x is the total number of active processors after the addition. For example, when going from 2-3 processors, the percentage of fingerprints change ownership is 33%. When going from 7-8 processors, the percentage of fingerprints change ownership is 12.5%. Thus, for each addition of an active processor up until nmax, the percentage of fingerprints that change ownership decreases. These percentages represent a significant decrease relative to other potential solutions, for example, the solution described above in relations to Equation 1.

Returning to method 500 of FIG. 5, after determining the ownership of fingerprint groups in step 504, in step 506 a fingerprint group ownership table (e.g., table 1600 described in relation to FIG. 16) may be populated based on the owners determined in step 504. FIG. 16 illustrates an example of a fingerprint group ownership table 1600 according to embodiments of the system described herein, which may be stored as fingerprint ownership table 306 of FIG. 3. Other embodiments of a fingerprint group ownership table, for example, variations of table 1600 are possible and are intended to fall within the scope of the invention. Table 1600 includes a plurality of entries 1606-1616, each entry representing a fingerprint group value range 1602, and each column 1604 represents a potential number of controllers. The examples of values illustrated in fingerprint group ownership table 1600 correspond to values that may be determined for an 8-engine VMAX storage system, as described above in relation to FIG. 9. For example, entries 1606, 1608, 1610, 1612, 1614 and 1616 may correspond to chunks C1 and C2 and sub-chunks C3_1, C3_2, C7-5 and C8_7, respectively. As specified in entry 1606, chunk C1 includes fingerprints groups 0-209; i.e., the first chunk of range 0-1680. For chunk C1, for any number of active controllers 1-8, controller 1 will own all fingerprint groups of chunk C1, such that all fingerprints of fingerprint groups 0-209 will be stored on active controller 1, for example, in a fingerprint table (e.g., a hash table) in local memory of controller 1. An example of a fingerprint table 1700 is described in relation to FIG. 17.

As specified in entry 1608, chunk C2 includes fingerprint groups 210-419; i.e., the second 210 fingerprint groups of range 0-1680. For chunk C2, when controller 1 is the only active controller, which is the only case in which controller 2 is not active, all fingerprint groups of chunk C2 are assigned to active controller 1, such that all fingerprints of fingerprint groups 210-419 are stored on controller 1. When 2-8 controllers are active, all fingerprints groups of chunk C2 are assigned to controller 2 such that all fingerprints corresponding to fingerprint groups 210-419 are stored on controller C2.

The values in entries 1610-1616 reflect the values illustrated in tables 1000-1500 of FIGS. 10-15. For example, entry 1616 corresponds to sub-chunk C8_7, which is a subset of chunk C8. Chunk C8 includes the last 210 fingerprint groups of the 1680 fingerprint groups, e.g., fingerprint groups 1470-1679. As reflected in 1000, the sub-chunk size of each of the sub-chunks in chunk C8 is 30 fingerprint groups. Thus, as shown in table 1600, the fingerprint group range of C8-7 is 1650-1679, the last 30 fingerprint groups. As reflected in tables 1000-1500, sub-chunk C8_7 is owned by a different active controller, 1-8, when the active number of controllers is 1-8, respectively, and this ownership is reflected in entry 1616.

FIG. 21 illustrates an example of a fingerprint group ownership table 2100, including chunk and sub-chunk identifiers in columns 2102 and 2102, according to some embodiments of the system in which an 8-engine VMAX storage system is used. Table 2100 shows an embodiment of a complete range of fingerprint group values 2106, and the owning storage controller for each potential number of active controllers 2108. As can be determined from table 2100, each time an active processor is added to the storage system, the percentage of fingerprint groups whose ownership changes is 100/x, where x is the total number of active processors after the addition. For example, when going from 2-3 active processors, 560 fingerprint groups move to controller 3 from controller 1 and 2, out of 1680 total fingerprint groups, and there is no movement between controller 1 and 2, such that the percentage of fingerprint groups moved is 560/1680=33%, Further, when going from 3-4 active processors, 420 fingerprint groups move to controller 4 from controllers 1, 2 and 32, out of 1680 total fingerprint groups, and there is no movement between controller 1, 2 and 3, such that the percentage of fingerprint groups moved is 420/1680=25%, Returning to method 500 of FIG. 5, in step 508, the fingerprint group ownership table may be stored, for example, in the local memory (e.g., 304) of one or more controllers (e.g., 302) and/or in a global memory of the storage system, for example global memory 26 of data storage system 12. In step 510, existing fingerprint tables (e.g., 1700) may be updated and new fingerprint tables added, e.g., on each owning controller, based on the determined ownership of fingerprint groups.

Figure 17:
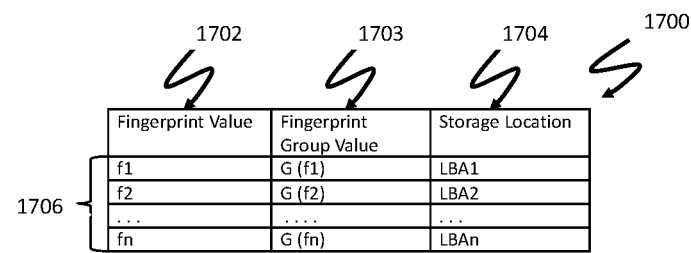
FIG. 17 illustrates an example of a fingerprint table according to embodiments of the system described herein.

FIG. 17 illustrates an example of a fingerprint table 1700 according to embodiments of the system described herein. Other embodiments of a fingerprint table, for example, variations of table 1700 are possible and are intended to fall within the scope of the invention. Fingerprint table includes a plurality of entries 1706, each entry corresponding to a fingerprint (e.g., hash) value 1702, and specifying a fingerprint group value in column 1703, and a storage location (e.g., a logical block address (LBA) or other identifier) in column 1704 at which the data portion from which the fingerprint was generated is stored. If the fingerprint value is not stored in any physical location, meaning that no data portion (e.g., track of data) currently stored in the system has this fingerprint, then the entry in column 1704 for the fingerprint may be null or blank. That is, in some embodiments, for example, as part of performing step 510, each fingerprint table may be pre-populated with fingerprint values before the fingerprints are actually generated for a given data portion as described elsewhere herein. For example, for the fingerprint groups owned by an active controller, all of the values in the fingerprint space that are members of (i.e., map to) the fingerprint group may be determined and an entry created in fingerprint table 1700. Alternatively, if no data portion currently stored on the data system has the fingerprint, there may not be an entry in table 1700 for the fingerprint; i.e., act 510 may not include creating an entry for the fingerprint.

Returning to method 500 of FIG. 5, in step 512, a fingerprint group index may be created, for example, on each active controller for the fingerprint group it owns. A fingerprint group index may include an entry for each fingerprint, the entry specifying all of the fingerprints that are members of the fingerprint group. Depending on the capacity of the storage system, and the size of the fingerprint space, it may not be desirable to create a fingerprint group index, which could be used, for example, when it is necessary to change fingerprint ownership, and thus move fingerprints between active processors in response to adding a new controller to a storage system, as described in more detail elsewhere herein.

Figure 18:
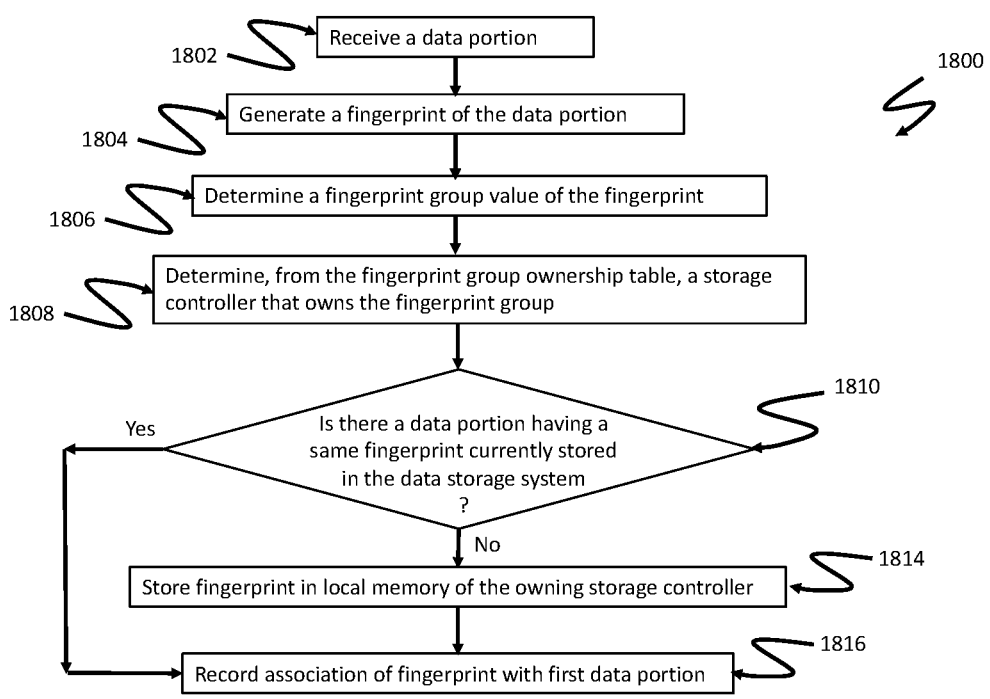
FIG. 18 is a flow chart illustrating an example of a method of performing data deduplication according to embodiments of the system described herein.

FIG. 18 is a flow chart illustrating an example of a method of performing data deduplication according to embodiments of the system described herein. Other embodiments of a method of performing data deduplication, for example, variations of method 1800 are possible and are intended to fall within the scope of the invention. In step 1802, a data portion may be received. The data portion may have a size corresponding to a granularity at which data is being deduplicated, for example 128 KB, which may correspond to a physical or logical construct within the system, for example, a size defined for a track on a disk. Other sizes may be used, which may correlate to or at least take into consideration logical and physical constructs of the storage system, including, but not limited to, an extent, a super-extent, sub-extent, disk sector, block, object or file, to name a few. In some embodiments in which deduplication is performed post process, the data portion may have been retrieved from disk, whereas in embodiments in which in-line deduplication is used, the data portion may have been included in an I/O operation, for example a write operation.

In step 1804, a fingerprint of the data portion may be generated. Any of a variety of known or future developed techniques may be used to generate a fingerprint, for example, application of any of a variety of hash functions, e.g., in accordance with one of more standards such as SHA-1, SHA-2 or a variation thereof. Other hash functions may be used. In some embodiments, the function for generating the fingerprint function may be selected to generate fingerprints that have a random value within the space of possible fingerprint values. The size of the resulting fingerprint can be configured to be any of a variety of sizes based on any of a variety of factors such as, for example, the size of the data portion to be fingerprinted, the desired number of possible fingerprint values, the likelihood of generating the same fingerprint for different data portions (i.e., the likelihood of generating a false fingerprint match), compute and storage resource available and that would be consumed, etc. In some embodiments, for example, when a data portion size is 128 KB, the fingerprint size may be configured to be 32 bytes (256 bits). In some embodiments, the fingerprint may include more than just the hash value of the data portion, and, for example, include a logical and/or physical storage location of the data portion (e.g., currently stored or intended to be stored) and other metadata. For example, in some embodiments, a fingerprint is a 28-byte value that is a truncated SHA-2 32-byte value, the remaining four bytes including the storage location and/or other metadata relating to the data portion.

In step 1806, a fingerprint group value of the fingerprint may be determined. For example, as described in more detail elsewhere herein, the fingerprint group value may be generated by applying a modulo operation on the fingerprint, e.g., based on the LCM of: the potential numbers of storage controllers in the system; a multiple thereof, or a multiple of each potential number of controllers in the system, as described elsewhere herein. For example, in some embodiments, fingerprint group value=(fingerprint or portion thereof) modulo LCM. In some embodiments, only a portion of the fingerprint may be used to generate a fingerprint group value. Whether to use only a use a portion instead of the whole fingerprint, and the size of the portion, may be based on any of a variety of factors such as, for example, the size of the fingerprint, the desired number of possible fingerprint group values, compute and storage resources available and that would be consumed, etc. For example, in some embodiments, a 4-byte portion of the fingerprint may be used to determine a fingerprint group of a fingerprint, for example, when the fingerprint itself has a 32-byte size. In some embodiments using an 8-engine VMAX storage system, the fingerprint group value of a fingerprint may be determined as follows: fingerprint group=(4-byte portion of 28-byte hash value of 128K data portion) modulo 1680.

In step 1808, a storage controller that owns the determined fingerprint group may be determined, for example, from a fingerprint group ownership table, e.g., fingerprint group ownership table 1600 described in relation to FIG. 16. Step 1808 may include identifying the entry in table 1600 that corresponds to the fingerprint group value generated in step 1806. For example, if the determined fingerprint group value is 1435, it may be determined that this corresponds to entry 1614 of table 1600, which represents sub-chunk C7_5, ranging from 1420-1444. The owning storage controller then may be determined from the column of columns 1604 representing the number of current active controllers. For example, if the number of active controllers is 4, then the owning active controller is active controller 3 for fingerprint group value 1435. It should be appreciated that the active controller numbers, e.g., "3", are reference numbers generated prior to knowledge of what, if any, controllers ultimately will be activated. When an actual controller is activated, the controller reference number is then associated with the activated controller, e.g., an identifier of the activated controller.

In some embodiments, the owning active controller of a fingerprint group is the active controller at which the fingerprint table (e.g., hash table) including all fingerprints of the fingerprint group is stored and maintained, for example, in local memory of the active controller. In act 1810, it may be determined from the fingerprint table (e.g., table 1700 described above in relation to FIG. 17) of the owning controller whether a data portion having a same fingerprint is currently stored in the data storage system—i.e., whether there is a collision. For example, it may be determined whether the value in the entry of entries 1706 corresponding to the fingerprint generated in step 1804 has a value specifying a storage location in column 1704. If the value in column 1704 is empty or null, this may mean that no data portion having a same fingerprint is currently stored in the data storage system. Alternatively, table 1700 may be configured such that there is no entry in table 1700 if there is data portion having a same fingerprint is currently stored in the data storage system, in which case determining in step 1810 that there is no entry in table 1700 may indicate that there is no data portion having a same fingerprint currently stored in the data storage system.

If it is determined in step 1810 that there is not a data portion having a same fingerprint stored in the data system, then in step 1814 the generated fingerprint may be stored in local memory (e.g., 304) of the owning active controller determined in step 1808, for example, in a fingerprint table (e.g., 308) stored on the owning active controller (e.g., 302). Storing the fingerprint may include recording a physical storage location of the data portion. If the location has not yet been determined at the time of performance of step 1810, for example, if method 1800 is being performed in-line with an I/O operation, then recording the physical location may not occur until such location has been determined, e.g., as part of performing the I/O operation. In some embodiments, in which all fingerprint entries in a fingerprint table are prepopulated, e.g., initialized with the fingerprint values without any location information as described above in relation to step 510 of method 500, step 1814 may not require creation of the fingerprint entry, but rather updating the entry with the storage location.

In step 1816, one or more associations between the fingerprint may be recorded, for example, in one or variables or data structures involved in the post-process or in-line data deduplication process. If it was determined that there was already a data portion having the same fingerprint currently stored in the system in step 1810, a reference (e.g., pointer or link) to the entry in the fingerprint table including the fingerprint and/or the location on disk of the matching data portion may be recorded as part of the association. Further, a reference to the fingerprint and/or the disk location of the matching data portion may be stored at a disk location of the data portion currently being processed, once such location is determined.

Figure 19:
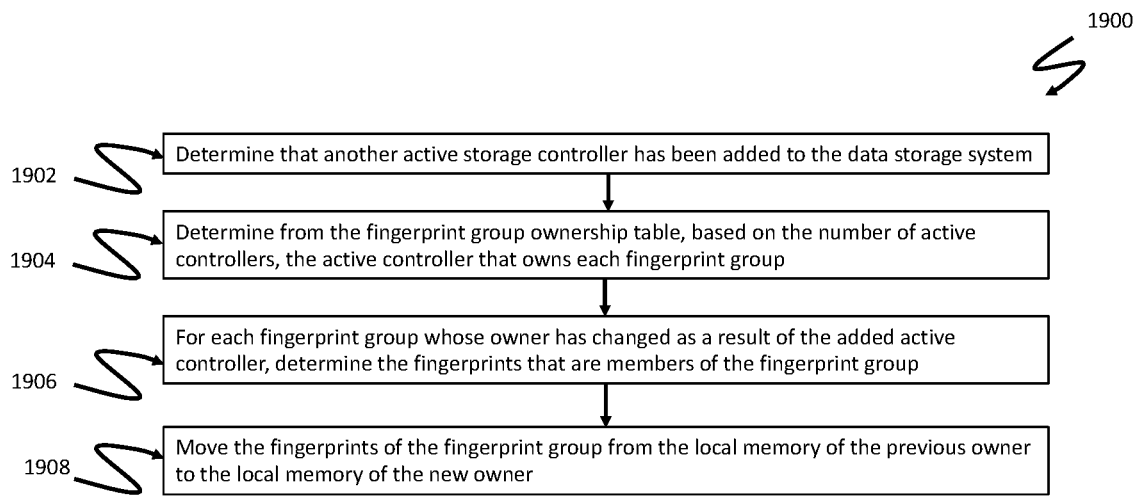
FIG. 19 is a flow chart illustrating an example of a method of moving fingerprints between fingerprint tables of controllers according to embodiments of the system described herein.

FIG. 19 is a flow chart illustrating an example of a method 1900 of moving fingerprints between fingerprint tables of controllers according to embodiments of the system described herein. Other embodiments of a method moving fingerprints between fingerprint tables of controllers, for example, variations of method 1900 are possible and are intended to fall within the scope of the invention.

In step 1902, it may be determined that another active controller has been added to the data storage system. Such determination may be made, for example, by inquiry (e.g., polling) or an automated or manual event notification. In step 1904, it may be determined from the fingerprint group ownership table (e.g., 1600), based on the new number of active controllers, the active controller that owns each fingerprint group. For example, with reference to the example illustrated in Table 1600, if the previous number of active controllers is 7, and the new number of active controllers is 8, then for all fingerprint groups of entry 1606, 0-209 (e.g., chunk C1), no change in ownership results. However, for the fingerprint groups of entry 1616, 1650-1679 (e.g., chunk C8_7), ownership changes from pre-existing active controller 7 to new active controller 8.

In step 1906, for each fingerprint group whose owner has changed as a result of the added active controller, the fingerprints that are members of the group may be determined. In some embodiments in which a fingerprint group index in maintained, as described elsewhere herein, fingerprints may be determined for each fingerprint group to be moved, for example, fingerprint groups 1650-1679, by reference to the fingerprint group index. Alternatively, the entries 1706 of the fingerprint table 1700 on the active controller of the fingerprint groups to be moved may be traversed to determine from the value in column 1703 the fingerprints belonging to the fingerprint groups for whom ownership has been changed. Other techniques may be used.

In step 1908, the fingerprints of the fingerprint group may be moved from the local memory of the previous owner to the local memory of the new owner, e.g., from a fingerprint table of the previous owner to a fingerprint table of the new owner. For example, the fingerprints to be moved may be deleted from the fingerprint table of the previous owner and added to the fingerprint table of the new owner.

Various embodiments discussed herein may be combined with each other in appropriate combinations in connection with the system described herein. Additionally, in some instances, the order of steps in the flowcharts, flow diagrams and/or described flow processing may be modified, where appropriate. It should be appreciated that any of the methods described herein, including 400, 500, 900, 1800 or 1900, or parts thereof, may be implemented using one or more of the systems described in relation to FIGS. 1-3 or components thereof. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage system in which fingerprints are determined for data portions of a predetermined size, a method of performing deduplication comprising:
grouping potential fingerprints into a plurality of fingerprint groups, the plurality of fingerprint groups representing a balanced distribution of the potential fingerprints;
for each of the plurality of fingerprint groups, assigning ownership of the fingerprint groups to one of a plurality of active controllers on the data storage system such that each active controller is assigned an equal number of the plurality of storage groups;

in response to adding an active storage controller to the data storage system, re-assigning ownership of at least one fingerprint group to the added active controller such that each active controller is still assigned an equal number of the plurality of storage groups and no fingerprint groups are reassigned between storage controllers that already were active prior to the adding of the active storage controller; and performing deduplication on the storage system based at least in part on the assignment of ownership of fingerprint groups to active controllers.

2. The method of claim 1, wherein a maximum percentage of fingerprint groups that are re-assigned to the added active storage controllers is: 100/x, wherein x is a number of active storage controllers on the data storage system after the adding of the active controller.

3. The method of claim 1, further comprising:
for at least each fingerprint determined for a data portion stored in the data storage system, storing the fingerprint in a fingerprint table of fingerprints in a local memory of an active storage controller determined to own the fingerprint group to which the fingerprint belongs.

4. The method of claim 3, wherein the data storage system has a predefined potential number of active storage controllers, the method further comprising:
populating a second table including a plurality of entries, each entry corresponding to one or more of the plurality of fingerprint groups and specifying, for each of the potential number of active storage controllers, the storage controller determined to own the fingerprint group.

5. The method of claim 4, wherein the plurality of entries of the second table do not change in response to adding another active storage controller of the potential number of active storage controllers to the data storage system.

6. The method of claim 4, further comprising:
receiving a first data portion;
determining a first fingerprint of the data portion; and
determining, using the second table, a first active storage controller of the plurality of active storage controllers that owns the first fingerprint,
wherein performing deduplication includes using a first fingerprint table in the local memory of the first active storage controller to perform deduplication processing of the first data portion.

7. The method of claim 1, wherein the data storage system has a predefined potential number of active storage controllers, and the method further comprising:
determining a quantity of fingerprint groups to be a lowest common multiple of each potential number of active storage controllers or a multiple thereof.

8. The method of claim 1, wherein the fingerprints are generated for the data portions using a hash function that produces a random distribution of fingerprint values in a space of possible fingerprint values.

9. A data storage system in which fingerprints are determined for data portions of a predetermined size, the data system comprising:
a plurality of active storage controllers;
one or more processors; and
a memory comprising code stored thereon that, when executed, performs a method comprising:
grouping potential fingerprints into a plurality of fingerprint groups, the plurality of fingerprint groups representing a balanced distribution of the potential fingerprints;

for each of the plurality of fingerprint groups, assigning ownership of the fingerprint groups to one of the plurality of active controllers on the data storage system such that each active controller is assigned an equal number of the plurality of storage groups;

in response to adding an active storage controller to the data storage system, re-assigning ownership of at least one fingerprint group to the added active controller such that each active controller is still assigned an equal number of the plurality of storage groups and no fingerprint groups are reassigned between storage controllers that already were active prior to the adding of the active storage controller; and performing deduplication on the storage system based at least in part on the assignment of ownership of fingerprint groups to active controllers.

10. The system of claim 9, wherein a maximum percentage of fingerprint groups that are re-assigned to the added active storage controllers is: 100/x, wherein x is a number of active storage controllers on the data storage system after the adding of the active controller.

11. The system of claim 9, wherein the method further comprises:
for at least each fingerprint determined for a data portion stored in the data storage system, storing the fingerprint in a fingerprint table of fingerprints in a local memory of an active storage controller determined to own the fingerprint group to which the fingerprint belongs.

12. The system of claim 11, wherein the data storage system has a predefined potential number of active storage controllers, and
wherein the method further comprises populating a second table including a plurality of entries, each entry corresponding to one or more of the plurality of fingerprint groups and specifying, for each of the potential number of active storage controllers, the storage controller determined to own the fingerprint group.

13. The system of claim 12, wherein the plurality of entries of the second table do not change in response to adding another active storage controller of the potential number of active storage controllers to the data storage system.

14. The system of claim 12, wherein the method further comprises:
receiving a first data portion;
determining a first fingerprint of the data portion; and
determining, using the second table, a first active storage controller of the plurality of active storage controllers that owns the first fingerprint,
wherein performing deduplication includes using a first fingerprint table in the local memory of the first active storage controller to perform deduplication processing of the first data portion.

15. The system of claim 9, wherein the data storage system has a predefined potential number of active storage controllers, and
wherein the method further comprises determining a quantity of fingerprint groups to be a lowest common multiple of each potential number of active storage controllers or a multiple thereof.

16. The system of claim 9, wherein the fingerprints are generated for the data portions using a hash function that produces a random distribution of fingerprint values in a space of possible fingerprint values.

17. One or more non-transitory computer-readable media having software stored thereon for a data storage system on which fingerprints are determined for data portions of a predetermined size, the software comprising:
   executable code that groups potential fingerprints into a plurality of fingerprint groups, the plurality of fingerprint groups representing a balanced distribution of the potential fingerprints;
   executable code that, for each of the plurality of fingerprint groups, assigns ownership of the fingerprint groups to one of a plurality of active controllers on the data storage system such that each active controller is assigned an equal number of the plurality of storage groups;
   executable code that, in response to adding an active storage controller to the data storage system, re-assigns ownership of at least one fingerprint group to the added active controller such that each active controller is still assigned an equal number of the plurality of storage groups and no fingerprint groups are reassigned between storage controllers that already were active prior to the adding of the active storage controller; and
   executable code that performs deduplication on the storage system based at least in part on the assignment of ownership of fingerprint groups to active controllers.

18. The one or more non-transitory computer-readable media of claim 17, wherein a maximum percentage of fingerprint groups that are re-assigned to the added active storage controllers is: 100/x, wherein x is a number of active storage controllers on the data storage system after the adding of the active controller.

19. The one or more non-transitory computer-readable media of claim 17, the software further comprising:
   executable code that, for at least each fingerprint determined for a data portion stored in the data storage system, stores the fingerprint in a fingerprint table of fingerprints in a local memory of an active storage controller determined to own the fingerprint group to which the fingerprint belongs.

20. The one or more non-transitory computer-readable media of claim 17, wherein the data storage system has a predefined potential number of active storage controllers, and wherein the software further comprises:
   executable code that determines a quantity of fingerprint groups to be a lowest common multiple of each potential number of active storage controllers or a multiple thereof.

* * * * *